United States Patent [19]

Walsh et al.

[11] 3,925,093

[45] Dec. 9, 1975

[54] ADDITION OF PYRIDINIUM $C_{12-16}$ ALKYL BENZENE SULFONATE TO GAMMA-METHACRYLOXYPROPYLTRIS (BETA-METHOXYETHOXY)SILANE

[75] Inventors: John J. Walsh; Vincent T. Chuang, both of Marietta, Ohio

[73] Assignee: Union Carbide Corporation, New York, N.Y.

[22] Filed: Feb. 12, 1973

[21] Appl. No.: 331,980

[52] U.S. Cl. .................... 106/287 SB; 260/448.8 R

[51] Int. Cl.² .............................................. C09K 3/00

[58] Field of Search .............. 260/448.2 S, 448.8 R; 106/287 SB

*Primary Examiner*—Lewis T. Jacobs

*Attorney, Agent, or Firm*—George A. Skoler

[57] ABSTRACT

This invention is directed to minimizing the development of haze in aqueous dispersions containing gamma-methacryloxypropyltris (beta-methoxyethoxy) silane by providing a relatively small quantity of pyridinium $C_{12-16}$ alkyl benzene sulfonate in the aqueous dispersion.

4 Claims, No Drawings

ADDITION OF PYRIDINIUM $C_{12-16}$ ALKYL BENZENE SULFONATE TO GAMMA-METHACRYLOXYPROPYLTRIS (BETA-METHOXYETHOXY)SILANE

This invention is directed to the manufacture of aqueous dispersions of gamma-methacryloxypropyltris (beta-methoxyethoxy)silane (herein sometimes referred to as A–175) containing therein a small quantity of pyridinium $C_{12-16}$ alkyl benzene sulfonate which possess less haze and a lower apparent oil content than a comparable aqueous dispersion of gamma-methacryloxypropyltris(beta-methoxyethoxy)silane absent the pyridinium $C_{12-16}$ alkyl benzene sulfonate.

Gamma-methacryloxypropyltrimethoxysilane is a commercial coupling agent which is employed to enhance the bonding of various resins to metal oxides or metalloid oxide substrates. One of the deficiencies of this compound is that when added to water it has limited stability therein, characterized as a pot life of typically not more than about 8 hours. The dispersion of the silane in water is adjusted to a pH of about 4 in order to obtain any reasonable level of dispersion for utilization as a treating agent for such substrates. However, the silane chemically condenses within a relatively short period of time causing the formation of silsesquioxanes of a molecular weight enough to cause the formation of solid precipitates. This places a limit upon how long a given dispersion may be used before it must be replaced by another dispersion. It is known in the utilization of vinyl hydrolyzable silanes that if one provides hydrolyzable groups on the vinyl silane which are Cellosolve™ derivatives such as methyl Cellosolve™ ($CH_3OCH_2CH_2OH$), the dispersibility of the silane in water is tremendously enhanced. Thus, vinyl trimethoxysilane is considerably less dispersible in water than vinyltris(beta-methoxyethoxy)silane. The latter silane is employed in most cases simply because of its better dispersibility characteristics in water. Utilizing this logic, the beta-methoxyethoxy derivative of gamma-methacryloxypropyltrimethoxysilane has been prepared, and it is chemically characterized as gammamethacryloxypropyltris(beta-methoxyethoxy)silane, However, though this silane has the expected improved dispersibility in water over gamma-methacryloxypropyltrithoxysilane it frequently forms an insoluble oil which will typically coat the container wall and, upon shaking, will form oil droplets within the aqueous media. It also produces enough condensation upon standing to provide a relatively hazy dispersion.

This haziness is believed to render the silane less efficient as a coupling agent when, as such a hazy aqueous dispersion, the silane is employed in the treatment of such metallic oxide or metalloid oxide substrates for the purpose of enhancing coupling of resins to such substrates.

It is the object herein to demonstrate a very simple and effective manner by which such haziness and such obnoxious oily deposits can be minimized. Moreover, the aqueous dispersion of this invention has a longer pot life than has heretofore been obtainable with a conventional aqueous dispersion of this silane.

This invention involves providing a small amount of pyridinium $C_{12-16}$ alkyl benzene sulfonate in a freshly made aqueous dispersion of gamma-methacryloxypropyltris(beta-methoxyethoxy)silane. This invention also involves mixtures of gamma-methacryloxypropyltris(betamethoxyethoxy)silane and a small quantity of pyridinium $C_{12-16}$ alkyl benzene sulfonate, which mixtures can be readily dispersed in water to provide the advantages described above.

The amount of pyridinium $C_{12-16}$ alkyl benzene sulfonate which is employed, based on the weight of the gamma-methacryloxypropyltris(beta-methoxyethoxy)-silane to which it is added, may range from about 0.075 to about 5 weight percent, preferably about 0.2 to about 2 weight %. Very desirable results have been obtained using a small amount such as about 0.6 weight percent.

In the preferred embodiment, the pyridinium $C_{12-16}$ alkyl benzene sulfonate is added to the gamma-methacryloxypropyltris(beta-methoxyethoxy)silane in the amounts indicated above simply by mixing the two together. Then the mixture is added directly to water in the amount which is desired for the purposes of using the silane as a coupling agent. Generally, the amount of silane which is added to form the aqueous dispersion ranges from about 0.5 weight per cent to about 10 weight per cent, and preferably from about 1 weight per cent to about 5 weight per cent, based on the weight of the dispersion. Generally, the aqueous dispersion is rendered acidic, generally to a pH below about 5 and typically above about 3.0. A common pH for use of the silane is about 4.0

EXAMPLES

Preparation of Pyridinium Dodecylbenzene Sulfonate (PDBS) solution

Into a 6 ounce bottle were charged 32.6 g., 0.1 mole, of dodecylbenzene sulfonic acid and 41.4 g. of methyl Cellosolve. While stirring with a magnetic stirring bar, 8.8 g., 0.1 mole, of pyridine were added slowly over two minutes. An immediate exotherm to about 45°C. was observed. Upon cooling, a clear, light amber, solution of $C_{12}H_{25}C_6H_4SO_3^-N^+HC_5H_5$, pyridinium dodecylbenzene sulfonate, 50 wt-% active in methyl Cellosolve solvent was obtained. Complete solubility at 2 wt-% in distilled water was demonstrated.

The 50 wt-% methyl Cellosolve solution of PDBS prepared above was used to obtain a series of samples of gamma-methacryloxypropyltris(beta-methoxyethoxy)silane containing incremental amounts of from 0.0375 to 2.4 wt-% of dissolved PDBS additive. The latter samples are used to prepare 1 wt-% test mixtures in 6 ounce round bottom bottles, by the addition of 1 gram of the treated silane to 99 g. of distilled water, adjusted to a pH 4.0 with glacial acetic acid. The heterogeneous aqueous test mixtures were vigorously mixed for 30 minutes on a laboratory style wrist-action shaker and observed. Data in Table 1 suggests that 0.075 wt-% PDBS is the minimum concentration needed to eliminate insoluble precipitate and surface oil in each of three samples of silane produced at different times. The clarity of resulting solutions were unaffected by the presence of PDBS additive and in one instance, clarity was significantly improved.

Data in Table 2 indicates that similar treatment of randomly chosed lots of the same silane with a minimum of 0.6 wt-% of PDBS additive is generally useful to reduce aqueous solution Haze No. to at least No. 30, and to eliminate insoluble surface oil.

Data in Table 3 shows storage stability of the PDBS treated silane after it had been stored five months by its actual performance on glass fibers used in reinforcing polyester composites employing the resulting properties of the composites to reflect the effectiveness of the silane.

TABLE 1

MINIMUM CONCENTRATION OF PYRIDIMUM DODECYLBENZENE SULFONATE (PDBS) ADDITIVE TO IMPROVE AQUEOUS SOLUTION PROPERTIES

| Sample No. of gamma-methacryloxypropyltris (beta-methoxyethoxy) silane | Wt-% PDBS added (50 wt-% active) | Aqueous Solution Properties (1 wt-% active in pH 4.0 water) Haze No. | Observed Precipitate and/or Oil |
|---|---|---|---|
| 1 | 0.6 | >30 | no |
| 1 | 0.3 | '' | no |
| 1 | 0.15 | '' | no |
| 1 | 0.075 | '' | yes |
| | 0.0375 | '' | yes |
| 1 | | | |
| 1 | none | '' | yes |
| 2 | 0.6 | 9 | no |
| 2 | 0.3 | 9 | no |
| 2 | 0.15 | 9 | no |
| 2 | 0.075 | 9 | yes |
| 2 | 0.0375 | 9 | yes |
| 2 | none | — | yes |
| 3 | 0.6 | 10 | no |
| 3 | 0.3 | 10 | no |
| 3 | 0.15 | 8 | no |
| 3 | 0.075 | 10 | yes |
| 3 | 0.0375 | 10 | yes |
| 3 | none | >30 | yes |

TABLE 2

EFFECT OF PYRIDINIUM DODECYLBENZENE SULFONATE (PDBS) ON THE SOLUBILITY PROPERTIES OF SELECTED SAMPLES OF GAMMA - METHACRYLOXYPROPYLTRIS (BETA - METHOXYETHOXY) SILANE

| Sample No. | Wt-% PDBS added (50 wt-% Active) | Aqueous Solution Properties (1 wt-% active in pH 4.0 water) Haze No. | Observed Precipitate and/or Oil |
|---|---|---|---|
| 4 | none | >30 | yes |
| 4 | 0.6 | 30 | no |
| 4 | 1.2 | 15–30 | no |
| 4 | 2.4 | 15 | no |
| 2 | none | 8 | yes |
| 2 | 0.6 | 7 | no |
| 2 | 1.2 | 6 | no |
| 2 | 2.4 | 4 | no |
| 5 | none | 6 | no |
| 5 | 0.6 | 6 | no |
| 1 | none | >30 | yes |
| 1 | 0.6 | 15–30 | no |
| 3 | none | >30 | yes |
| 3 | 0.6 | 6 | no |

TABLE 3

EFFECT OF PDBS ON PERFORMANCE OF A-175 AS A FINISH IN GLASS REINFORCED POLYESTER[1] COMPOSITES[2]

| Fiber Finish | % $H_2O$ Adsorbed | Flexural Strength (psi × $10^{-3}$) Initial | 8Hr. Boil | % Retention |
|---|---|---|---|---|
| a.)A-175 | 0.35 | 80.5 | 77.7 | 96.5 |
| b.)A-175+ 0.6% PDBS | 0.35 | 83.4 | 83.4 | 100.0 |
| c.)A-175+ 1.2% PDBS | 0.37 | 78.8 | 78.3 | 99.4 |
| d.)A-175+ 2.4% PDBS | 0.36 | 80.1 | 81.8 | 102.1 |
| e.)A-175+ 0.6% PDBS and aged 5 mo. | 0.37 | 78.3 | 78.1 | 99.7 |
| f.)same as e.) above. | 0.37 | 74.3 | 78.3 | 105.4 |
| g.)A-174[3] | 0.43 | 80.8 | 76.1 | 94.2 |
| h.)none[4] | 0.91 | 52.8 | 21.1 | 40.0 |

[1]Paraplex P-43 (General purpose polyester resin from Rohm and Haas Inc.
[2]Wet lay-up of 12 alternating layers of liquid resin and fiberglass fabric
[3]gamma-methacryloxypropyltrimethoxysilane
[4]181-112 heat cleaned fiberglass fabric Similar results are obtainable using e.g., pyridinium tridecyl benzene sulfonate, pyridinium tetradecyl benzene sulfonate, pyridinium pentadecylbenzene sulfonate and pyridinium hexadecyl benzene sulfonate, as replacements for the pyridinium dodecyl benzene sulfonate employed in the examples.

The haze numbers ("Haze No.") referred to above are values from a procedure to measure the extent of haze in a material relative to that of a standard. The reagants employed in the procedure are 1. A Standard Zinc Solution made as follows: Dissolve 6.6 gm. of reduction-grade zinc in 20 ml. of concentrated HCl and dilute to one liter with distilled water.
2. 1% Starch solution — freshly prepared.
3. 0.1 N-Sodium Hydroxide.

A series of standards are prepared by placing in a series of 100 ml. (tall form) Nessler tubes, 10 ml. of the starch solution. Then 10 ml. of 0.1 N-sodium hydroxide are added to each tube followed by dilution to the mark with distilled water. To each tube is added the amounts of the standard zinc solution required to give the range of "Haze No." standards desired. Each 0.2 ml. of the zinc solution is equivalent to 2 mg. of zinc hydroxide or a Haze No. of 2.

Any range of standards can be made up. The following are examples that can be used for most turbidity tests:

| Haze No. Standard | Milliliters of Standard Zn Solution Added | Milligrams of $Zn(OH)_2$/100 ml. |
|---|---|---|
| 2 | 0.2 | 2 |
| 4 | 0.4 | 4 |
| 6 | 0.6 | 6 |
| 8 | 0.8 | 8 |
| 10 | 1.0 | 10 |
| 12 | 1.2 | 12 |
| 15 | 1.5 | 15 |
| 30 | 3.0 | 30 |

In determining the "Haze No." of a sample, compare the turbidity of the sample with the standards using 100 ml. Nessler tubes in a rack. Viewing should be directly through the solutions using a light of adequate intensity reflected through the bottom of the tube.

What is claimed is:

1. Gamma-mathacryloxypropyltris (beta-methoxyethoxy) silane containing a small quantity of pyridinium $C_{12-16}$ alkyl benzene sulfonate wherein the amount of pyridinium $C_{12-16}$ alkyl benzene sulfonate which is present, based upon the weight of the gamma-methacryloxypropyltris(beta-methoxyethoxy)silane, is from about 0.75 to about 5 weight per cent.

2. The composition of claim 1 wherein the $C_{12-16}$ alkyl is dodecyl.

3. An aqueous dispersion of gamma-methacryloxypropyltris(beta-methoxyethoxy)silane in which there is provided a small quantity of pyridinium $C_{12-16}$ alkyl benzene sulfonate wherein the amount of pyridinium $C_{12-16}$ alkyl benzene sulfonate which is present, based upon the weight of the gamma-methacryloxypropyltris(beta-methoxyethoxy)silane, is from about 0.75 to about 5 weight per cent.

4. The dispersion of claim 3 wherein the $C_{12-16}$ alkyl is dodecyl.

* * * * *

UNITED STATES PATENT OFFICE

CERTIFICATE OF CORRECTION

Patent No. 3,925,093 Dated December 9, 1975

Inventor(s) John J. Walsh, Vincent T. Chuang

It is certified that error appears in the above-identified patent and that said Letters Patent are hereby corrected as shown below:

Column 1, line 28, after the word "weight" insert -- high --.

Column 1, line 44, change " , " to -- . --.

Column 1, lines 46 and 47, "gamma-methacryloxypropyltrithoxy-silane" should read -- gamma-methacryloxypropyltriethoxysilane --.

Column 2, line 62, "chosed" should read -- chosen --.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*